US012586918B2

(12) United States Patent
Dardenne et al.

(10) Patent No.: US 12,586,918 B2
(45) Date of Patent: Mar. 24, 2026

(54) COMMUNICATIONS ASSEMBLY AND ASSOCIATED METHOD

(71) Applicant: AGC GLASS EUROPE, Louvain-la-Neuve (BE)

(72) Inventors: Xavier Dardenne, Grez-Doiceau (BE); Mohsen Yousefbeiki, Gosselies (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 199 days.

(21) Appl. No.: 18/559,239

(22) PCT Filed: May 3, 2022

(86) PCT No.: PCT/EP2022/061885
§ 371 (c)(1),
(2) Date: Nov. 6, 2023

(87) PCT Pub. No.: WO2022/238184
PCT Pub. Date: Nov. 17, 2022

(65) Prior Publication Data

US 2024/0235048 A1 Jul. 11, 2024

(30) Foreign Application Priority Data

May 12, 2021 (EP) .................................... 21173598

(51) Int. Cl.
*H01Q 15/00* (2006.01)
*H01Q 1/12* (2006.01)

(52) U.S. Cl.
CPC ....... *H01Q 15/0013* (2013.01); *H01Q 1/1271* (2013.01)

(58) Field of Classification Search
CPC ......................... H01Q 1/1271; H01Q 15/0013
See application file for complete search history.

(56) References Cited

U.S. PATENT DOCUMENTS

2008/0129619 A1* 6/2008 Lee ........................ H01Q 21/26 343/810
2018/0159241 A1 6/2018 Niembro et al.
2022/0200156 A1* 6/2022 Sonoda ................ H01Q 19/062

FOREIGN PATENT DOCUMENTS

WO WO 2021/054175 A1 3/2021

OTHER PUBLICATIONS

International Search Report Issued Aug. 18, 2022, in PCT/EP2022/061885, filed on May 3, 2022, 3 pages.

* cited by examiner

*Primary Examiner* — Daniel Munoz
(74) *Attorney, Agent, or Firm* — Oblon, McClelland, Maier & Neustadt, L.L.P.

(57) ABSTRACT

A communications assembly including a glazing panel and at least one antenna designed to receive and transmit electromagnetic waves at a working frequency between 400 MHz and 70 GHz; the glazing panel having an external surface and an internal surface facing the antenna. The communication assembly includes a metasurface placed between the antenna and the external surface; the metasurface includes at least one periodic conducting structure that includes thin periodic conducting elements. The communication assembly further includes a dielectric slab placed between the antenna and the internal surface at a non-zero distance from the internal surface.

14 Claims, 5 Drawing Sheets

COMMUNICATIONS ASSEMBLY AND ASSOCIATED METHOD

This application is a National Stage entry under 35 U.S.C. § 371 of PCT/EP2022/06 1885 filed May 3, 2022, and claims benefit EP 21173598.0, filed May 12, 2021. The contents of each of these applications are incorporated herein by reference.

TECHNICAL FIELD

The present application relates to communications assembly, especially Wi-Fi, 4G, 5G, V2X and Dedicated Short Range Communication (DSRC) comprising at least one antenna designed to receive and transmit electromagnetic waves at a working frequency comprised between 400 MHz and 70 GHz.

BACKGROUND ART

Mobile usage is increasing every year, with 80% of mobile calls happening inside buildings. Buildings and dwellings have higher requirements in terms of thermal insulation, and materials used to meet that need have strong effect on indoor signal attenuation.

Distributed antenna system can be a solution for mobile indoor coverage, but they also present drawbacks. First, they require complex installation, and hardware that can have significant cost. Moreover, they imply maintenance and replacement costs. Finally, they are often working for a single operator and can't be scaled for all situations.

A method to significantly improve the transmission through the glazing panels without compromise on their thermal performance and/or aesthetics is to treat the low-E coating when exists on the glazing panels such that a low-pass and/or a band-pass frequency selective surface (FSS) is created. This method can be applied on the entire glazing panels or partially, depending on the building situation and customer needs for a better indoor mobile coverage.

However, in higher frequency bands, such as in 5G mm-wave frequencies, only the treatment of the low-E coating is not sufficient to significantly improve the transmission of electromagnetic waves through glazing panels. This is because the glazing panel, which comprises one or multiple dielectric panels with a thickness comparable to the effective wavelengths at those frequencies, acts as a filter, and can significantly decrease the transmission of electromagnetic waves passing through.

Then the level of degradation depends on the glazing panel configuration, i.e. the number, thickness and arrangement of dielectric panels, the polarization and the direction of arrival of electromagnetic waves as well as on the frequency.

In parallel, mobile data traffic is increasing continuously and will boom significantly with 5G, putting mobile network operators under CAPEX pressure. Higher frequency bands for 5G mean more challenges for coverage deployment, especially in dense urban areas where capacity will be needed and strict EMF limitations apply. The deployment of small cells are described as a good solution for capacity improvement which requires to install a large number of antennas in order to stably perform electromagnetic wave transmission and reception.

However, many drawbacks limit the deployment of small cells. First, it is very difficult to find location for new antennas. Second, bringing fiber and electricity outdoor is costly. Finally, urbanistic regulations may limit possibilities for small cells.

On top of that, with the advent of connected and autonomous vehicles, the number of required onboard antennas is ever increasing, and finding suitable locations becomes more and more complicated especially for Wi-Fi, 4G, 5G and DSRC.

Therefore, installing antennas on a vehicle glazing panel, or just behind it appears as an attractive alternative to other locations.

However, because of the composition and non-negligible thickness, as compared to usable wavelength, a vehicle glazing panel could cause attenuation of the EM waves passing through it. This attenuation is mainly caused by the interferences between the incoming wave and the multiple other waves reflected by the several interfaces comprised in a vehicle glazing.

To alleviate the above described problems and to remove the barriers to outdoor 4G and 5G network densification, there is a demand for indoor installation of the antennas in line with urban aesthetics and EMF constraints.

However, as stated earlier, the glazing panel can significantly decrease the antenna radiation towards the outside, even if the low-E coated is treated like an FSS, particularly in Wi-Fi, 4G, 5G sub-6 GHZ, mm-wave bands and DSRC. In addition, the window can reflect the signal towards the indoor, and thus to increase the electromagnetic field (EMF) for the building residents.

The document WO2019177144 describes antenna unit to be used while attached to window glass of a building, wherein: the antenna unit is provided with an emission element, a waveguide member positioned on an outdoor side relative to the emission element, and a conductor positioned on an indoor side relative to the emission element creating Yagi-Uda-like parasitic directors. The drawback is that the design is very complicated and it can depend on the antenna structure itself. Thus, it cannot be generalized to any type of window assembly and need a specific design for each window assembly.

The document WO2016203180 describes a conductive element with a periodic pattern placed on glazing including a coated glass sheet, one surface of which is covered with a conductive layer.

These two documents describe a solution for increasing, for a predetermined frequency, the transmission of radiofrequency electromagnetic waves by having a zero transmission at a frequency of between substantially half and substantially double the frequency.

Thus, with these solutions is not possible to minimize, for a certain range of frequencies and glazing configurations, the transmission loss of electromagnetic waves.

The document US2020048958 describes a film bonded on a surface of a window and configured to reduce ta transmission loss of EM waves through the window. This cannot control the gain while controlling the phase of the EM wave.

SUMMARY OF INVENTION

The present invention relates, in a first aspect, to a communications assembly comprising a glazing panel and at least one antenna designed to receive and transmit electromagnetic (EM) waves at a working frequency comprised between 400 MHz and 70 GHz; the glazing panel comprises an external surface and an internal surface facing the antenna.

The solution as defined in the first aspect of the present invention is based on that the communication assembly comprises a metasurface placed between the antenna and the external surface, in that the metasurface comprises at least one periodic conducting structure comprising thin periodic conducting elements, and in that communication assembly further comprises a dielectric slab placed between the antenna at a non-zero distance (Dds) from the internal surface.

The present invention relates, in a second aspect, to a method for optimizing the reception/transmission of a communication assembly comprising a glazing panel and an antenna designed to receive and transmit electromagnetic waves at a frequency between 400 MHz and 70 GHz; the glazing panel comprises an external surface and an internal surface facing the antenna.

The solution as defined in the second aspect of the present invention is based on that the method comprises a step of installing a metasurface between the antenna and the external surface. The metasurface comprises at least one periodic conducting structure comprising thin periodic conducting elements. The method further comprises a step of installing a dielectric slab placed between the antenna and the internal surface at a non-zero distance (Dds) from the internal surface.

The present invention relates, in a third aspect, to the use of a metasurface and a dielectric slab to improve the reception/transmission of a communication assembly comprising a glazing panel and an antenna designed to receive and transmit electromagnetic waves at a frequency between 400 MHz and 70 GHz; the glazing panel comprises an external surface and an internal surface facing the antenna; the metasurface comprises at least one periodic conducting structure comprising thin periodic conducting elements, characterized in that the metasurface is installed between the antenna and the external surface. The dielectric slab is installed between the antenna and the internal surface at a non-zero distance (Dds) from the internal surface.

Surprisingly, this solution permits to improve the gain while controlling the phase of the transmitted EM waves. The metasurface controls the phase of EM waves reflected on the interfaces of the glazing panel while the dielectric slab boosts and improves the gain of EM waves by creating a cavity between the glazing panel and the dielectric slab. The metasurface can effectively manipulate the phase of the incoming and reflected waves in order to have constructive interferences at the working frequency.

Thus, the metasurface and the dielectric slab permits to compensate the attenuation of the EM waves passing through the glazing panel and more of that the metasurface and the dielectric slab permits to boost EM waves passing through the glazing panel.

The present invention increases the transmission of EM waves by having a metasurface between the antenna and the external surface and a dielectric slab placed between the antenna and the internal surface at a non-zero distance from the internal surface.

Therefore, the present invention solves the need to place antennas behind a glazing panel, especially a glazing panel used as a window in a building or a vehicle glazing panel, with boosted communication performances and with reduced loss of transmission.

It is an object of the present invention to alleviate the above described problems and to solve the need to place antennas behind a glazing panel with boosted communication performances and with reduced loss of transmission.

Another advantage of the present invention is to provide the possibility to place an antenna in the front of and at a minimized distance from the glazing panel, to radiate through the dielectric support, while maintaining the impedance response of the antenna as well as the radiation properties of the antenna within the specifications.

Another advantage of the present invention is to be used to minimize the transmission loss of transverse electric (TE) polarized EM waves through the glazing panels at highly oblique incidence angles, and to provide a better balance between the reception and/or transmission of transverse electric (TE) polarized and transverse magnetic (TM) polarized electromagnetic waves.

Another advantage of the present invention is to be used to alter the direction of propagation of electromagnetic waves transmitted through the assembly compared to the direction of propagation of EM waves incident onto the assembly. It is noted that the invention relates to all possible combinations of features recited in the claims or in the described embodiments.

The following description relates to building and vehicle glazing applications but it's understood that the invention may be applicable to others fields like transportation applications, other road users and/or services.

BRIEF DESCRIPTION OF THE DRAWINGS

This and other aspects of the present invention will now be described in more detail, with reference to the appended drawings showing various exemplifying embodiments of the invention which are provided by way of illustration and not of limitation. The drawings are a schematic representation and not true to scale. The drawings do not restrict the invention in any way. More advantages will be explained with examples.

DETAILED DESCRIPTION

Figure 1:
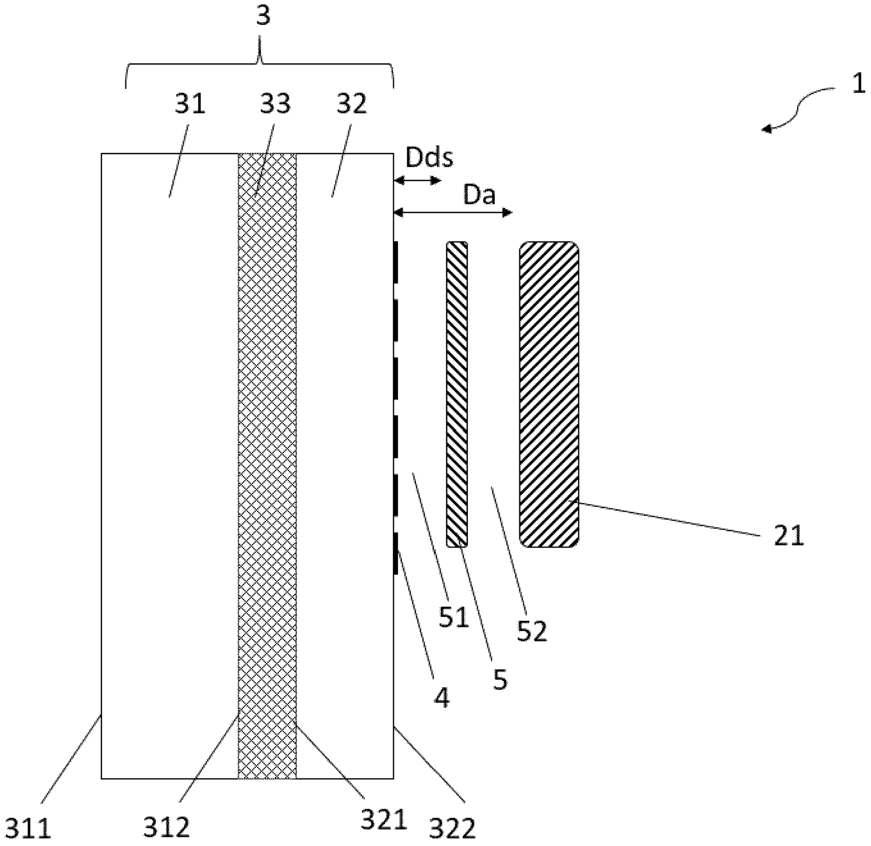
FIG. 1 is a schematic view of a first embodiment of a communication assembly according to the invention.

In this document to a specific embodiment and include various changes, equivalents, and/or replacements of a corresponding embodiment. The same reference numbers are used throughout the drawings to refer to the same or like parts.

As used herein, spatial or directional terms, such as "inner", "outer", "above", "below", "top", "bottom", and the like, relate to the invention as it is shown in the drawing figures. However, it is to be understood that the invention can assume various alternative orientations and, accordingly, such terms are not to be considered as limiting. Further, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims are approximations that can vary depending upon the desired properties sought to be obtained by the present invention. In the following description, unless otherwise specified, expression "substantially" mean to within 10%, preferably to within 5%.

Moreover, all ranges disclosed herein are to be understood to be inclusive of the beginning and ending range values and to encompass any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more, e.g. 1 to 6.1, and ending with a maximum value of 10 or less, e.g., 5.5 to 10. Further, as used herein, the terms "deposited over" or "provided over" mean deposited or provided on but not necessarily in surface contact with. For example, a coating "deposited over" a substrate does not preclude the presence of one or more other coating films of the same or different composition located between the deposited coating and the substrate.

Where the term "comprising" is used in the present description and claims, it does not exclude other elements or steps. Where an indefinite or definite article is used when referring to a singular noun e.g. "a" or "an", "the", this includes a plural of that noun unless something else is specifically stated. In this document, "configured to (or set to)" may be interchangeably used in hardware and software with, for example, "appropriate to", "having a capability to", "changed to", "made to", "capable of", or "designed to" according to a situation. In any situation, an expression "device configured to do" may mean that the device "can do" together with another device or component.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein. When it is described that a constituent element (e.g., a first constituent element) is "(functionally or communicatively) coupled to" or is "connected to" another constituent element (e.g., a second constituent element), it should be understood that the constituent element may be directly connected to the another constituent element or may be connected to the another constituent element through another constituent element (e.g., a third constituent element).

According to a first aspect of the invention, as illustrated in FIGS. 1 to 4, the communications assembly 1 comprising a glazing panel 3 and at least one antenna 21 designed to receive and transmit electromagnetic waves at a working frequency (frw) comprised between 400 MHz and 70 GHz.

The glazing panel 3 can be a window used as a window to close an opening of the stationary object, such as a building, or to close an opening of the mobile object, such a train, a boat, . . . . The glazing panel can also be a panel used as a decorative and/or functional panel such as a B-pillar, a panel used between windows in vehicles, a bumper of a vehicle, or alike.

The glazing panel can be made of plastic, glass or any suitable material.

In some embodiments, the glazing panel comprises a first glass sheet having a surface S1, corresponding to surface 311, and a surface S2.

In embodiments were the glazing panel comprises only this first glass sheet, the surface S2 correspond to the surface 322.

In some preferred embodiments, the glazing panel is a multi-glazed window.

The multi-glazed window can be at least partially transparent to visible waves for visibility, and natural or artificial light. The multi-glazed window is made of multiple glass sheet, at least a first and a second glass sheets separated by at least one interlayer, forming multiple interfaces. The panels therefore can be separated by an interlayer which is a space filled with gas and/or by a polymeric interlayer. The second glass sheet having a surface S3 and a surface S4

In some embodiments, the multi-glazed window 2 can comprise at least two glass sheets 31, 32 separated by a spacer 33 allowing to create a space filled by a gas like Argon to improve the thermal isolation of the multi-glazed window, creating an insulating multi-glazed window. The invention is not limited to apparatus for use on multi-glazed window having two panels. The apparatus and method of the present invention are suitable for any multi-glazed window such as double, triple glazed windows.

In some embodiments, the panel interlayer 33 is a thermoplastic interlayer bonding the first glass sheet and the second glass sheet together meaning that the glazing panel can be a laminated multi-glazed window such as those to reduce the noise and/or to ensure the penetration safety. The thermoplastic interlayer can be made by one or more interlayers positioned between glass sheets. The interlayers are typically polyvinyl butyral (PVB) or ethylene-vinyl acetate (EVA) for which the stiffness can be tuned. These interlayers keep the glass sheets bonded together even when broken in such a way that they prevent the glass from breaking up into large sharp pieces.

Said first and/or second glass sheets of the multi-glazed window can be made of glass, polycarbonate, PVC or any other material used for a window mounted on a stationary object or on a mobile object.

Usually, the material of the glass sheets of multi-glazed window 3 is, for example, soda-lime silica glass, borosilicate glass, aluminosilicate glass or other materials such as thermoplastic polymers or polycarbonates which are especially known for automotive applications. References to glass throughout this application should not be regarded as limiting.

The multi-glazed window 3 can be manufactured by a known manufacturing method such as a float method, a fusion method, a redraw method, a press molding method, or a pulling method. As a manufacturing method of the multi-glazed window, from the viewpoint of productivity and cost, it is preferable to use the float method.

Each panel can be independently processed and/or colored, . . . and/or have different thickness in order to improve the aesthetic, thermal insulation performances, safety, . . . . The thickness of the multi-glazed window 2 is set according to requirements of applications.

The multi-glazed window 3 can be any known window used in situ. For example, the multi-glazed window 3 can be processed, i.e. annealed, tempered, . . . to respect the specifications of security and anti-theft requirements. The window can independently be a clear glass or a colored glass, tinted with a specific composition of the glass or by applying an additional coating or a plastic layer for example. The window can have any shape to fit to the opening such as a rectangular shape, in a plan view by using a known cutting method. As a method of cutting the multi-glazed window, for example, a method in which laser light is irradiated on the surface of the multi-glazed window to cut the multi-glazed window, or a method in which a cutter wheel is mechanically cutting can be used. The multi-glazed window can have any shape in order to fit with the application, for example a windshield, a sidelite, a sunroof of an automotive, a lateral glazing of a train, a window of a building, . . . .

Each glass sheet can be processed, i.e. annealed, tempered, . . . to respect the specifications of security requirements. The transparent dielectric slab can independently be a clear or a colored transparent dielectric panel, tinted with a specific composition or by applying an additional coating or a plastic layer for example.

Each glass sheet can be independently processed and/or colored, . . . and/or have different thickness in order to improve the aesthetic, safety, . . . .

The shape of the multi-glazed window in a plan view is usually a rectangle. Depending of the application, the shape is not limited to a rectangle and may be a trapeze, especially for a windshield or a backlite of a vehicle, a triangle, especially for a sidelight of a vehicle, a circle or the like.

In addition, the multi-glazed window can be assembled within a frame or be mounted in a double skin façade, in a carbody or any other means able to maintain a multi-glazed window. Some plastics elements can be fixed on the multi-glazed window to ensure the tightness to gas and/or liquid, to ensure the fixation of the multi-glazed window or to add external element to the multi-glazed window. In some embodiments, a masking element, such as an enamel layer, can be added on part of the periphery of the multi-glazed window.

For thermal comfort inside the stationary object or mobile object, a coating system can be present on one interface of the multi-glazed window 211, 212, 221, 222. This coating system generally uses a metal-based layer and infrared light is highly refracted by this type of layer. Such coating system is typically used to achieve a low-energy multi-glazed window.

In some embodiment, the coating system can be a heatable coating applied on the multi-glazed window to add a defrosting and/or a demisting function for example and/or to reduce the accumulation of heat in the interior of a building or vehicle or to keep the heat inside during cold periods for example. Although coating system are thin and mainly transparent to eyes.

Usually, the coating system is covering most of the surface of the interface of the multi-glazed window 3.

The coating system can be made of layers of different materials. In some embodiments, for example in automotive windshields, the coating system can be electrically conductive over the majority of one major surface of the multi-glazed window. This can causes issues such as heated point if the portion to be decoated is not well designed.

A suitable coating system is for example, a conductive film. A suitable conductive film, is for example, a laminated film obtained by sequentially laminating a transparent dielectric, a metal film, and a transparent dielectric, ITO, fluorine-added tin oxide (FTO), or the like. A suitable metal film can be, for example, a film containing as a main component at least one selected from the group consisting of Ag, Au, Cu, and Al.

Typically, the coating system has an emissivity of not more than 0.4, preferably equals to or less than 0.2, in particular equals to or less than 0.1, equals to or less than 0.05 or even equals to or less than 0.04.

The coating system may comprise a metal based low emissive coating system. Such coating systems typically are a system of thin layers comprising one or more, for example two, three or four, functional layers based on an infrared radiation reflecting material and at least two dielectric coatings, wherein each functional layer is surrounded by dielectric coatings. The coating system of the present invention may in particular have an emissivity of at least 0.010. The functional layers are generally layers of silver with a thickness of some nanometers, mostly about 5 to 20 nm. The dielectric layers are generally transparent and made from one or more layers of metal oxides and/or nitrides. These different layers are deposited, for example, by means of vacuum deposition techniques such as magnetic field-assisted cathodic sputtering, more commonly referred to as "magnetron sputtering". In addition to the dielectric layers, each functional layer may be protected by barrier layers or improved by deposition on a wetting layer.

In some embodiments, to maximize the transmission and the reception through the glazing panel having a coating system, a decoated portion can be used to reduce attenuation due to the coating system.

As shown in FIGS. 1 to 4, the glazing panel 3 comprises a first 31 and a second 32 glass sheets separated by an panel interlayer 33.

The glazing panel comprises an external surface 311 and an internal surface 322 facing the antenna. The term "facing" denotes that the antenna is in front of the internal surface as illustrated in figures.

The antenna 21 is designed to receive and transmit electromagnetic waves at a working frequency (frw) comprised between 400 MHz and 70 GHz depending on the desired applications.

In some embodiments, when the communication assembly 1 is used as a 4G-communication assembly, the working frequency is comprised between 400 MHZ and 2.3 GHZ.

In some embodiments, when the communication assembly 1 is used as a 5G assembly, the working frequency can be comprised between 1.5 GHz and 6 GHZ for low band, around 28 GHZ, 35 GHz or above up-to 70 GHz depending on the specific 5G applications.

In some embodiments, when the communication assembly 1 is used as a DSRC assembly, the working frequency is comprised between 5.7 GHZ and 6 GHz.

DSRC is one-way or two-way short-range to medium-range wireless communication channels that enables vehicles to communicate with each other and other road users or services directly, without involving cellular or other telecom infrastructure.

The metasurface comprises at least one periodic conducting structure comprising thin periodic conducting elements, each conducting element being isolated from each other. Thin periodic conducting elements means periodic element having a thickness, measured perpendicularly to the surface where elements are placed on. This thickness is preferably from a 1 μm to 140 μm. More preferably, to avoid delamination and/or peel off, this thickness is comprises between 3 μm to 30 μm.

According to an embodiment, material of the conductive elements can be metal-based material such as Copper, Silver, conductive metal alloys with or without plated material, such as gold, or any other material able to be electrically conductive. According to an embodiment, the array of conductive elements can be a layer of a metal oxide or of a polymer.

According to the invention, the thin periodic conductive elements can be made of thin metallic sheets such as copper foil, silver print, . . . , thin metallic wires, thin copper meshes, or alike.

According to an embodiment, each non-conductive element has the shape of a square, rectangular, or circular ring or any other closed shape.

According to an embodiment, each non-conductive element has the shape of a straight, bended, curved slot, or crossed forms.

According to an embodiment, each non-conductive element has the shape two rings, one encompassed inside the other.

Figure 5:
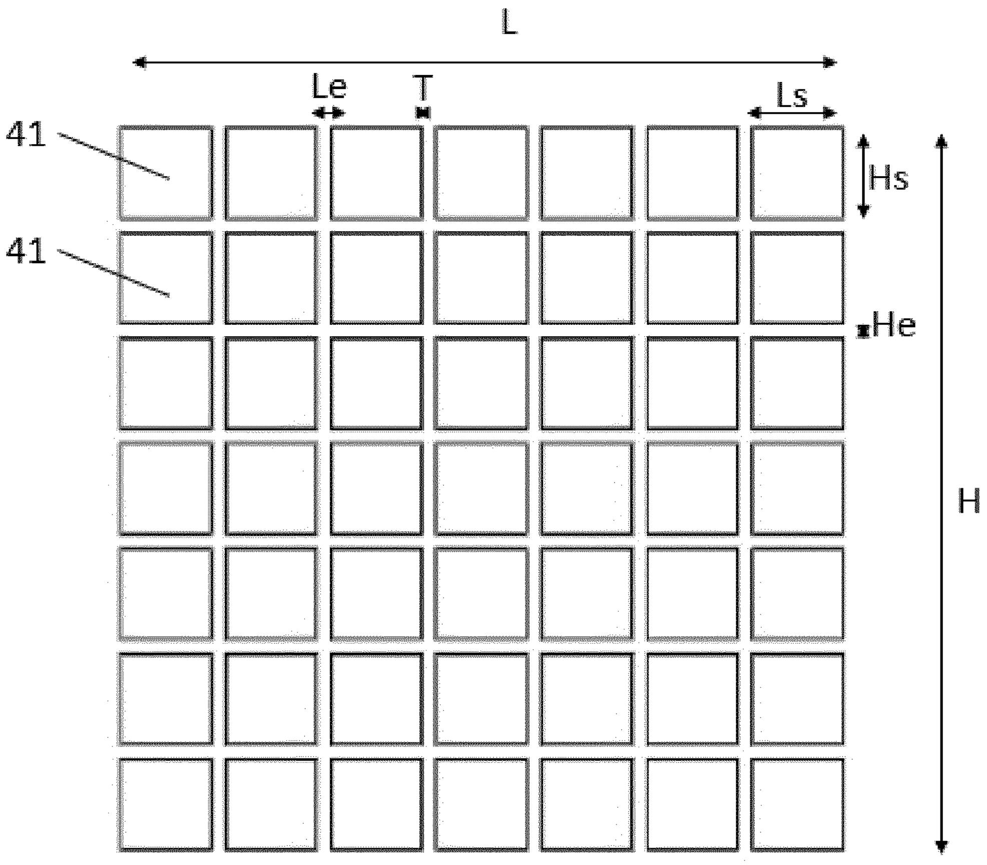
FIG. 5 is a schematic view of a periodic conductive structure according to the invention

As illustrated in FIG. 5, the at least one periodic conducting structure can comprise conductive squares 41. The metasurface can be made of any periodic conducting structure that exhibits a band-pass or a band-stop behavior. In some other embodiments where the metasurface has a band-stop behaviour, shape can be square loops, circle loops, hex loops or alike and For multi-band effect, it could also be dual loops for instance or any other shape giving a multi-band effect.

In some embodiments, the at least one periodic conducting structure of the metasurface has a zero reflection at at least one frequency (fr) in the range from substantially third to substantially three times the determined frequency and preferably from substantially half to substantially twice the working frequency.

In some other embodiments, the at least one periodic conducting structure of the metasurface has a zero transmission at at least one frequency (fr) in the range from substantially third to substantially three times the determined frequency and preferably from substantially half to substantially twice the working frequency. Preferably in such embodiments, each conducting element are isolated from each other.

As shown in FIGS. 1 to 4, the communication assembly further comprises a metasurface 4 placed between the antenna and the external surface.

Figure 2:
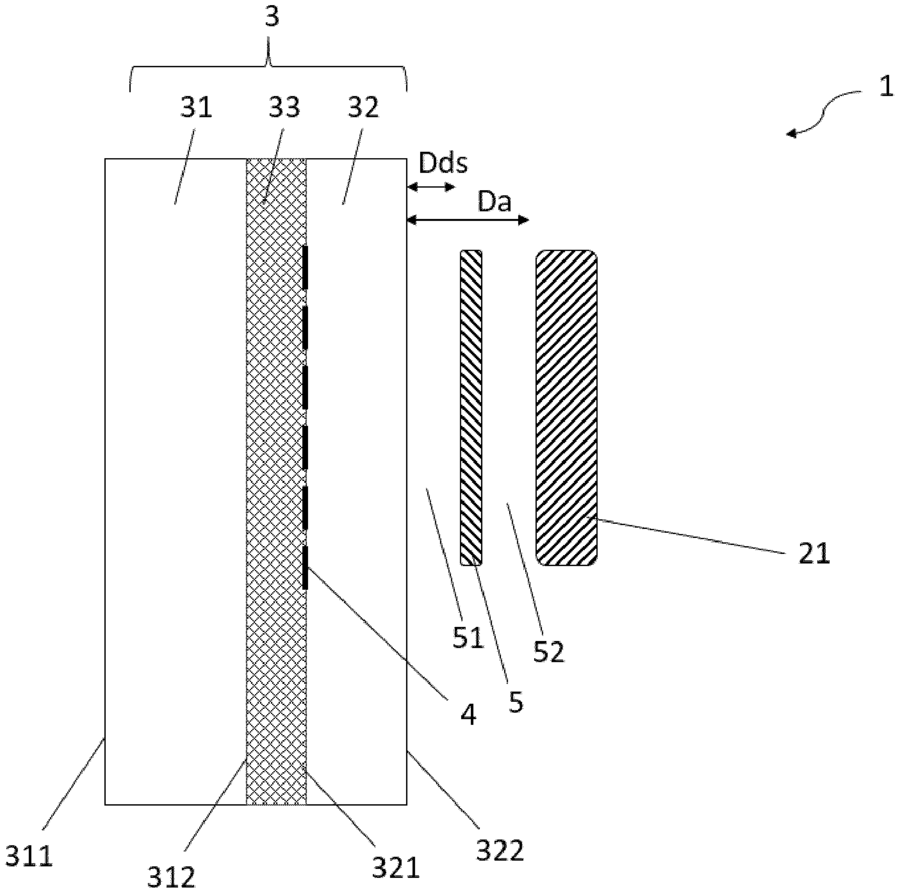
FIG. 2 is a schematic view of a second embodiment of a communication assembly according to the invention.
Figure 3:
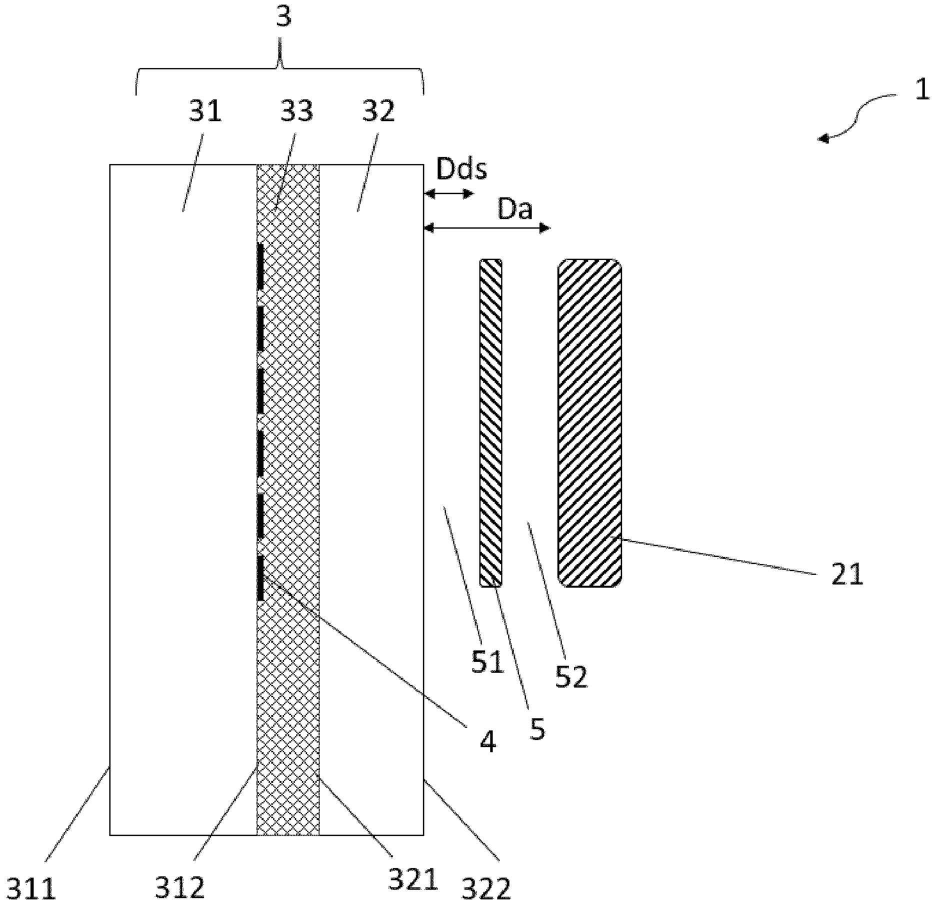
FIG. 3 is a schematic view of a third embodiment of a communication assembly according to the invention.

According to some embodiments, as shown in FIGS. 1 to 3, the metasurface can placed on one surface 312, 321, 322 of the glazing panel. It is understood that, in such embodiments, the metasurface is placed on one surface of the glazing panel 3 which is between the external surface 311 and the antenna.

In embodiments where the glazing panel has single glass sheet, the first glass sheet, the metasurface can be placed on the surface S2, corresponding to the surface 322. In embodiments where the glazing panel comprises a first glass sheet and a second glass sheet, the metasurface can be placed on the surface S2, S3 or S4, respectively corresponding to surface 312, 321 or 322.

In some embodiments, the metasurface can be placed on or inside the interlayer 33 to facilitate handling and steps of assembly.

The metasurface placed on surface 312, 321 or on or inside the interlayer of the glazing panel means that the metasurface is preferably not in contact with the exterior glazing panel.

In some embodiments, the window assembly can comprise at least two metasurfaces to optimize the same working frequency or to optimize different working frequencies.

In some preferred embodiments, the metasurface is transparent to let visible light passing through the installation interface. The term "transparent" denotes a property illustrating the average TL (light transmission) of visible light transmitted through a material in the visible spectrum of at least 1%. Preferably, transparent relates to a TL property of at least 10%. More preferably, transparent denotes a TL of at least 50%. Ideally, transparent denotes a TL of at least 70%.

In some embodiments, the metasurface can further comprise a dielectric foil to support the conductive elements and the conductive elements are disposed on the dielectric foil. A dielectric foil is a foil that is not electrically conductive.

In some embodiments, the dielectric foil is a flexible dielectric foil.

In some embodiments, the dielectric foil is not transparent such as PCB.

Preferably, the dielectric foil is a transparent dielectric support. The transparent dielectric foil can have different chemical composition, such as plastic-based composition. The plastic-based composition can be PET, polycarbonate, PVC or any other transparent dielectric plastic-based that can be used as a foil.

Preferably, the dielectric foil comprises a glass panel. The glass panel can comprises at least 50% in weight of SiO2 such as glass like soda lime glass, aluminosilicate glass or borosilicate glass.

Preferably, the dielectric foil can have a loss tangent equals to or smaller than 0.03 and more preferably the loss tangent of the dielectric foils is equal to or smaller than 0.02 and more preferably the loss tangent of the dielectric foils is equal to or smaller than 0.01 to reduce the energy loss in foils.

In preferred embodiments, the dielectric foils has a loss tangent equals to or smaller than 0.005 and more preferably the loss tangent of the dielectric foils is equal to or smaller than 0.003 to reduce the energy loss in foils.

Preferably, the dielectric foil is borosilicate glass foil to reduce the loss tangent to a value equals to or is smaller than 0.01.

The dielectric foil can be manufactured by a known manufacturing method such as a float method, a fusion method, a redraw method, a press molding method, or a pulling method. As a manufacturing method of the glass panel, from the viewpoint of productivity and cost, it is preferable to use the float method.

The dielectric foil can be processed, i.e. annealed, tempered, . . . to respect the specifications of security requirements. The dielectric slab can independently be a clear or a colored transparent dielectric panel, tinted with a specific composition or by applying an additional coating or a plastic layer for example.

In some embodiments, the size of the surface of the metasurface is substantially the same as the size of the surface of the glazing unit.

In some other and preferred embodiments, the size of the metasurface is smaller than the surface of the glazing unit. Preferably, the size of the metasurface is substantially comprises between 1 $cm^2$ and 1 $m^2$. Preferably, the metasurface is comprises in a parallelepiped with a width and/or a length comprised between 20 mm to 1000 mm for example a rectangular shape of 210 mm×250 mm, a rectangular shape of 150 mm×160 mm or rectangular shape of 255 mm×500 mm depending of the operating frequencies and the application.

In some embodiments, the thickness of the metasurface is smaller than the thickness of the glazing panel. Preferably, the thickness of the metasurface is smaller than the thickness of the thinner glass panels of the glazing unit.

FIG. 1, FIG. 2 and FIG. 3 show a metasurface placed on the surface of the glazing panel respectively the internal surface 322, or one of the surface between one of the second or the first glass sheets and the interlayer, namely surface 321 and surface 312.

As illustrated in FIGS. 1 to 4, the communication assembly further comprises a dielectric slab placed between the antenna and the internal surface. The dielectric slab is not electrically conductive as such.

The dielectric slab is placed at a non-zero distance Dds from the internal surface creating a cavity for EM waves between the glazing panel and the dielectric slab.

By having a metasurface and a dielectric slab, the antenna can be placed at a reduced distance Da from the internal surface 322. This reduced distance Da is higher than the non-zero distance Dds (Da>Dds).

In some embodiment, the dielectric slab further comprises a glazing panel

In some embodiments, the dielectric slab is a flexible dielectric support.

In some embodiments, the dielectric slab is not transparent such as PCB.

Preferably, the dielectric slab is a transparent dielectric support meaning that the dielectric slab is transparent to let visible light passing through the installation interface. The transparent dielectric slab can have different chemical composition, such as plastic-based composition. The plastic-based composition can be PET, polycarbonate, PVC or any other transparent dielectric plastic-based that can be used as a panel.

In some embodiments, the dielectric slab comprises a glass panel. The glass sheet can comprises at least 50% in weight of SiO2 such as glass like soda lime glass, aluminosilicate glass or borosilicate glass.

In some embodiments, the dielectric slab can have a loss tangent equals to or smaller than 0.03 and more preferably the loss tangent of the dielectric panels is equal to or smaller than 0.02 and more preferably the loss tangent of the dielectric panels is equal to or smaller than 0.01 to reduce the energy loss in panels.

In preferred embodiments, the dielectric slab has a loss tangent equals to or smaller than 0.005 and more preferably the loss tangent of the dielectric panels is equal to or smaller than 0.003 to reduce the energy loss in panels.

In some embodiments, the dielectric slab is borosilicate glass sheet to reduce the loss tangent to a value equals to or is smaller than 0.01.

The dielectric slab can be manufactured by a known manufacturing method such as a float method, a fusion method, a redraw method, a press molding method, or a pulling method. As a manufacturing method of the glass panel, from the viewpoint of productivity and cost, it is preferable to use the float method.

The dielectric slab can be processed, i.e. annealed, tempered, . . . to respect the specifications of security requirements. The dielectric slab can independently be a clear or a colored transparent dielectric panel, tinted with a specific composition or by applying an additional coating or a plastic layer for example.

The dielectric slab can have any shape. The shape of the transparent dielectric panels 5 in a plan view is not limited to a rectangle and may be a trapeze, a triangle, a square, a circle or the like.

In some embodiments, the thickness of the dielectric slab is smaller than the thickness of the glazing panel. Preferably, the thickness of the dielectric slab is smaller than the thickness of the thinner glass sheets of the glazing panel.

The dielectric slab 5 is separated from the glazing panel 3, and preferably from the internal surface 322, by a space 51. This space can be filled with air defining the non-zero distance Dds (Dds>0). In some embodiments, the distance can be adapted to increase the transmission of EM waves through the assembly. In some preferred embodiments, a slab fixing means can be used to ensure and/or adapt the distance Dds to the internal surface.

The space 52 between the antenna and the dielectric slab can be also filled by air. This space is the difference between Da and the sum of the thickness of the dielectric slab and Dds.

Preferably, the distance Dds is substantially between 1 mm to 20 mm for sub-6 GHz and between 0.1 mm to 5 mm for mm-wave frequencies.

In some particular embodiments, when the communication assembly is used as for DSRC working at a working frequency of 5.9 GHZ, the distance Dds can be about 1 mm while Da is about 11 mm with a dielectric slab, preferably but not limited to a FR4 based dielectric slab, having a thickness of about 3.7 mm. The at least one periodic conducting structure of the metasurface can have a zero reflection at at least one frequency (fr) in the range from substantially third to substantially three times the determined frequency and preferably from substantially half to substantially twice the working frequency and, as illustrated in FIG. 5, can have a surface (L×H) of about 85 mm (L=85 mm) by 85 mm (H=85 mm) placed on the external surface. Squares can have a side Ls, Hs (Ls=Hs in case of square) of about 11 mm. The distance between each square of a same row Le is about 1.5 mm. The distance between each square of a same column He is about 1.5 mm. The thickness of the square, meaning the thickness of the perimeter is about 0.2 mm.

The slab fixing means or antenna fixing means can be used also to maintain and/or adapt the distance Da between the antenna and the internal surface.

Figure 4:
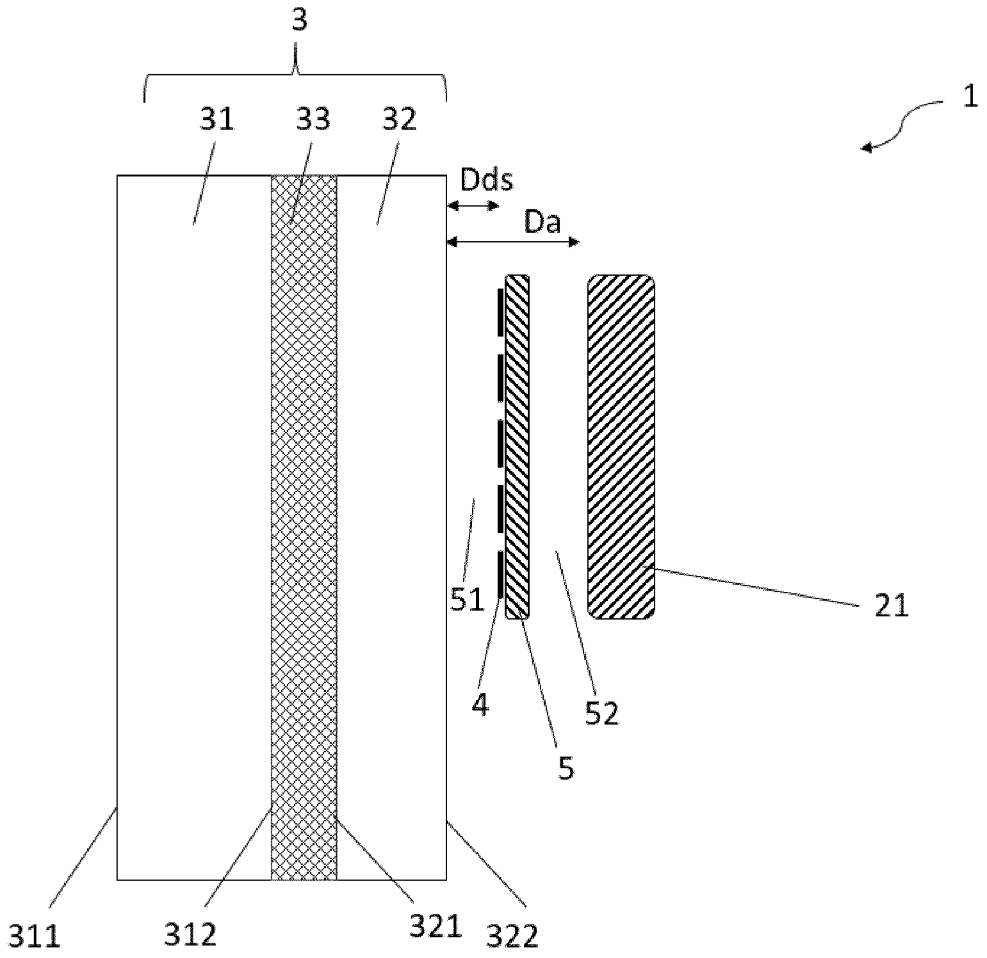
FIG. 4 is a schematic view of a fourth embodiment of a communication assembly according to the invention.

FIG. 4 shows another embodiment in which the metasurface 4 is placed on a surface of the dielectric slab. It is understood that any surface of the installation interlayer can be attached to any surface of the glazing panel.

The metasurface can be placed on one surface by any know manner such as gluing, lamination with an installation interlayer, decoating in embodiments where a coating exists on this surface, or alike.

Such installation interlayer can be transparent plastic interlayer. Transparent plastic interlayer can be polyvinyl butyral (PVB), ethylene-vinyl acetate (EVA), polymethyl methacrylate (PMMA), a polycarbonate (PC), a polystyrene (PS), a polyvinyl chloride (PVC), a polyamide (PA), a polyetherimide (PEI), a polyethylene terephthalate (PET), a polyurethane, an acrylonitrile butadiene styrene copolymer (ABS), a styrene acrylonitrile copolymer (SAN), a styrene methyl methacrylate copolymer (SMMA) and any mixtures of these, a crosslinked resin, an ionoplast, an ionomer, a cyclo-olefin polymer (COP), cyclo-Olefin copolymer (COC) or an Optical Clear Adhesive (OCA).

Crosslinked or cured resins are known to the skilled person and are three dimensional polymer networks obtained by the crosslinking/curing of low molecular weight species either by reaction with a curing agent also known as crosslinker or upon exposure to heat, UV radiations (UV) or electron beam (EB). Non exhaustive examples of crosslinked resins are epoxy resins, polyurethane resins, UV or EB curable resins. In the present invention, the precursors of the crosslinked resin may be transparent or not provided that the crosslinked resin is transparent.

Remark that some polymer mixtures, copolymers and some semi-crystalline polymers can be opaque and non-transparent due to a dispersed phase or due to the presence of crystallites. Hence it is possible that not all compositions of the listed polymers mentioned above are transparent. The person skilled in the art is capable to identify what composition is transparent and hence identify if a given polymer falls within the claimed transparent polymers.

In some embodiments, periodic conductive elements can be disposed directly on the glazing panel.

In some embodiments, the periodic conductive elements is a periodic pattern of conductive elements and preferably the periodic conductive elements are an array of conductive elements.

According to an embodiment, the array of conductive elements has a sheet resistance in the range from 0.02 to 1,000 ohms/square and preferably in the range from 0.02 to 3 ohms/square to avoid additional losses in conductive elements.

Preferably, the conductive elements comprises a unit cell 41 repeated on two dimensions, defined by at least one column and/or at least one row, to form a surface. More preferably, the array comprises several columns and several rows.

In some embodiments, the array of conductive elements comprises a row of non-periodic unit cells repeated on the column to from a surface.

In some other embodiments, the array of conductive elements comprises different unit cells in a non-periodic structure.

In some embodiments, the metasurface comprises a second array of conductive elements and so the metasurface is capable of increasing, for a second determined frequency fd2, the transmission of radio-frequency electromagnetic waves through the assembly.

In some embodiments, the metasurface comprises a plurality of array of conductive elements and so the metasurface is capable of increasing, for a determined frequency different for each array of conductive elements, the transmission of radio-frequency electromagnetic waves through the assembly.

The metasurface has a zero reflection at at least one frequency fr in the range from substantially third to substantially three times the determined frequency and preferably from substantially half to substantially twice the determined frequency.

The term "zero reflection" means a reflection below at least −6 dB, preferably below at least −10 dB and more preferably below at least −15 dB.

In some embodiments, to have a zero reflection at a frequency fr, the metasurface comprises an array of conductive elements like a band-pass FSS is used.

In some other embodiments, to have a zero reflection at a frequency fr, the metasurface comprises two arrays of conductive elements parallel to and untouching each other such that a first array is like a low-pass FSS and the second array is like a high-pass FSS.

In some embodiment, the dielectric slab is applied on a coated glazing panel. The overall performance can be kept similar to cases without coating, provided that a laser treatment is applied on the coating to locally increase its RF transparency at the desired frequency of operation. The laser decoating has to be designed to provide either a band-pass (e.g. band-pass FSS), low-pass (e.g. decoated grid), or high-pass (e.g. decoated patches) behavior to the coating, and that the transmission level of the coating is locally high at the desired frequency of operation.

An embodiment provides a vehicle comprising a least one communication assembly according to the first aspect of the invention.

In some embodiments, several communication assemblies can be placed on different location of the vehicle.

In preferred embodiments, a communication assembly is using the windshield as a glazing panel.

In some other embodiments, a communication assembly is using a B-pillar as a glazing panel.

In some other embodiments, a communication assembly is using a bumper of a vehicle as a glazing panel.

In some preferred embodiments, a communication assembly for tolling system is using the windshield as the glazing panel while another communication assembly is using B-pillar as glazing panel to communicate with payment terminals.

An embodiment provides a method for optimizing the reception/transmission of a communication assembly comprising a glazing panel and an antenna designed to receive and transmit electromagnetic waves at a working frequency (frw) comprised between 400 MHz and 70 GHz; the glazing panel comprises an external surface and an internal surface facing the antenna.

The method comprises a step of installing a metasurface between the antenna and the internal surface. The metasurface comprises at least one periodic conducting structure comprising thin periodic conducting elements.

The method further comprises a step of installing a dielectric slab placed between the antenna and the internal surface at a non-zero distance (Dds) from the internal surface.

Each step can be made separately.

This method allows to boost EM transparencies on new and/or already installed glazing panel.

In some embodiments where the metasurface is placed on the dielectric slab, these two steps can be made in the same time.

An embodiment provides use of the metasurface and a dielectric slab to improve the reception/transmission of a communication assembly comprising a glazing panel and an antenna designed to receive and transmit electromagnetic waves at a working frequency (frw) comprised between 400 MHz and 70 GHz; the glazing panel comprises an external surface and an internal surface facing the antenna; the metasurface comprises at least one periodic conducting structure comprising thin periodic conducting elements, each conducting element being isolated from each other characterized in that the metasurface is installed between the antenna and the external surface and in that the dielectric slab is installed between the antenna and the internal surface at a non-zero distance (Dds) from the internal surface.

An embodiment provides a use of a communication assembly according to the invention to improve the Wi-Fi communications.

An embodiment provides a use of a communication assembly according to the invention to improve the 4G communications.

An embodiment provides a use of a communication assembly according to the invention to improve at least a part of bands of 5G communications.

An embodiment provides a use of a communication assembly as a DSRC according to the invention to improve tolling communications.

An embodiment provides a use of a communication assembly according to the invention to improve payment communications between a vehicle and a fixed device such as a payment terminal of a fuel/electric charging station, of a parking, . . . .

An embodiment provides a use of a communication assembly according to the invention to improve specific communications between a vehicle and a fixed device such as an opening restricted areas gates, rescheduling bus stop schedules, . . . .

An embodiment provides a use of a communication assembly as a V2X communication assembly according to the invention to improve communications between a vehicle and his environment such as other vehicles, other users, infrastructure, . . . .

The invention claimed is:

1. A communications assembly comprising:

a glazing panel having a first glass sheet having an inner surface and an outer surface, a second glass sheet having an inner surface and an outer surface, and an interlayer between the inner surface of the first glass sheet and the inner surface of the second glass sheet;

at least one antenna designed to receive and transmit electromagnetic waves at a working frequency comprised between 400 MHz and 70 GHz; the glazing panel having an external surface and an internal surface facing the antenna;

a metasurface placed on the inner surface of the first glass sheet, the inners surface of the second glass sheet, or within the interlayer, the metasurface further comprising at least one periodic conducting structure comprising thin periodic conducting elements; and a dielectric slab placed between the antenna and the internal surface at a non-zero distance from the internal surface.

2. The communications assembly according to claim 1, wherein the at least one interlayer is a thermoplastic interlayer.

3. The communications assembly according to claim 1, wherein the at least one periodic conducting structure of the metasurface has a zero transmission at at least one frequency in a range from substantially one-third to substantially three times a determined frequency.

4. The communications assembly according to claim 3, wherein the at least one periodic conducting structure of the metasurface has a zero transmission at at least one frequency in a range from substantially half to substantially twice the working frequency.

5. The communications assembly according to claim 1, wherein the at least one periodic conducting structure of the metasurface has a zero reflection at at least one frequency in a range from substantially one-third to substantially three times a determined frequency.

6. The communications assembly according to claim 5, wherein the at least one periodic conducting structure of the metasurface has a zero reflection at at least one frequency in a range from substantially half to substantially twice the working frequency.

7. The communications assembly according to claim 1, wherein the metasurface is placed on one surface of the glazing panel.

8. The communications assembly according to claim 1, wherein the metasurface is placed on one surface of the dielectric slab.

9. The communications assembly according to claim 1, wherein the metasurface comprises a dielectric foil and the at least one periodic conducting structure is placed on the dielectric foil.

10. The communications assembly according to claim 1, wherein the at least one periodic conducting structure of the metasurface comprises thin metallic sheets.

11. The communications assembly according to claim 10, wherein the thin metallic sheets are selected from the group consisting of copper foils, silver print, thin metallic wires, or thin copper meshes.

12. The communications assembly according to claim 1, wherein the working frequency is comprised between 5.7 GHZ and 6 GHz.

13. A vehicle comprising a least one communications assembly according to claim 1.

14. A method for optimizing the reception/transmission of a communication assembly comprising a glazing panel and an antenna designed to receive and transmit electromagnetic waves at a working frequency comprised between 400 MHz and 70 GHz; the glazing panel having a first glass sheet having an inner surface and an outer surface, a second glass sheet having an inner surface and an outer surface, and an interlayer between the inner surface of the first glass sheet and the inner surface of the second glass sheet, an external surface of the second glass sheet facing the antenna; the method comprising:

installing a metasurface on the inner surface of the first glass sheet, the inners surface of the second glass sheet, or within the interlayer, the metasurface comprising at least one periodic conducting structure comprising thin periodic conducting elements; and installing a dielectric slab placed between the antenna and the internal surface at a non-zero distance from the internal surface.

* * * * *